T. C. RICHARDS.
Adjustable Hook for Hanging Pictures.
No. 167,620.            Patented Sept. 14, 1875.
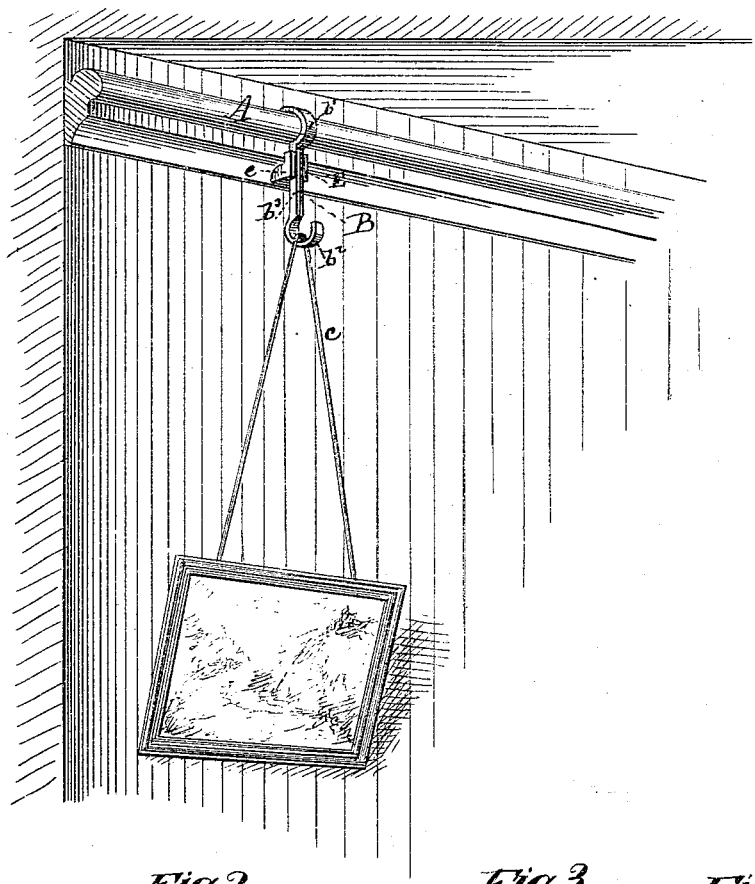
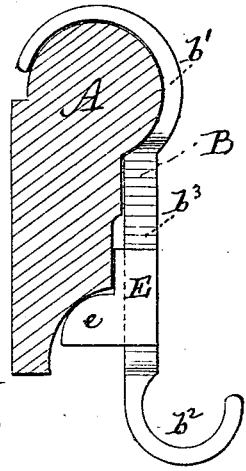
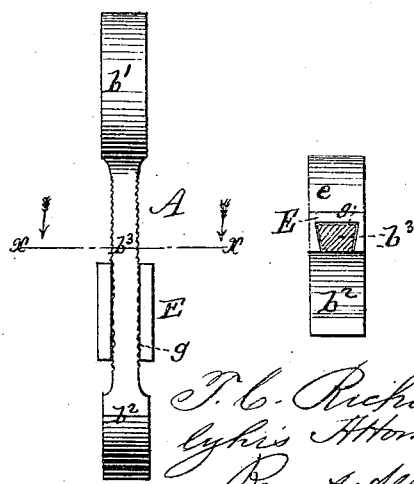

UNITED STATES PATENT OFFICE.

THOMAS C. RICHARDS, OF WEST WINSTED, CONNECTICUT.

IMPROVEMENT IN ADJUSTABLE HOOKS FOR HANGING PICTURES.

Specification forming part of Letters Patent No. 167,620, dated September 14, 1875; application filed February 12, 1875.

*To all whom it may concern:*

Be it known that I, THOMAS C. RICHARDS, of West Winsted, in the county of Litchfield and State of Connecticut, have invented an Adjustable Hook for Hanging Pictures, &c.; and I do hereby declare that the following is a full, clear, and exact description thereof, reference being had to the accompanying drawing, forming part of this specification.

My invention relates to hooks for hanging pictures from ornamental moldings secured to the walls of rooms at a suitable distance below the ceiling.

The invention consists in a picture-hook provided with an adjustable slide or bearing-piece, to adapt it to moldings of different sizes and forms, against the lower members of which said slide or piece obtains a bearing for the hook.

In the accompanying drawing, Figure 1 is a perspective view, showing the application of my invention to a molding on a wall. Fig. 2 is a side view of the hook with the molding in section. Fig. 3 is an edge view of the hook. Fig. 4 is a transverse section taken in the line $x\ x$ of Fig. 3.

The hook B represented has its upper end $b^1$ curved backward, for engagement with the molding A, and its lower end $b^2$ curved forward to receive the cord $c$ of a picture-frame or other article. The lower curve $b^2$ may be of any suitable form to receive the picture-cord. The shank $b^3$, or portion between the curves, is longitudinally straight, and preferably of dovetail form in its transverse section, and may have its sides corrugated or notched, as shown in Fig. 3. E is the adjustable slide or bearing-piece, which is placed on the shank $b^3$ of the hook. It is made of metal, with a projection, $e$, of quadrantal or other suitable form, on its rear edge for engagement with a concave member of the molding A, as shown in Figs. 1 and 2, so that the hook will hang vertically when engaged with the molding. The slide represented has in its back a groove or cavity, $g$, which corresponds in form with the transverse section of the shank $b^3$.

This groove may be corrugated or notched internally to conform to the sides of the said shank, or may be plain, and simply held to its required position on the said shank by its own elasticity or friction. The slide or adjustable piece may, however, be variously constructed; but is, in any case, so fitted to the shank of the hook that it may easily be adjusted thereon to different positions, in order to bear against a suitable member of the molding, or with the members of moldings of different shapes and sizes within certain limits.

What I claim as new, and desire to secure by Letters Patent, is—

The combination, with a hook for hanging pictures, of an adjustable slide or bearing-piece, substantially as described, whereby the said hook is adapted to moldings of different size and shape, substantially as set forth.

T. C. RICHARDS.

Witnesses:
BENJAMIN W. HOFFMAN,
VERNON H. HARRIS.